Patented Oct. 31, 1933

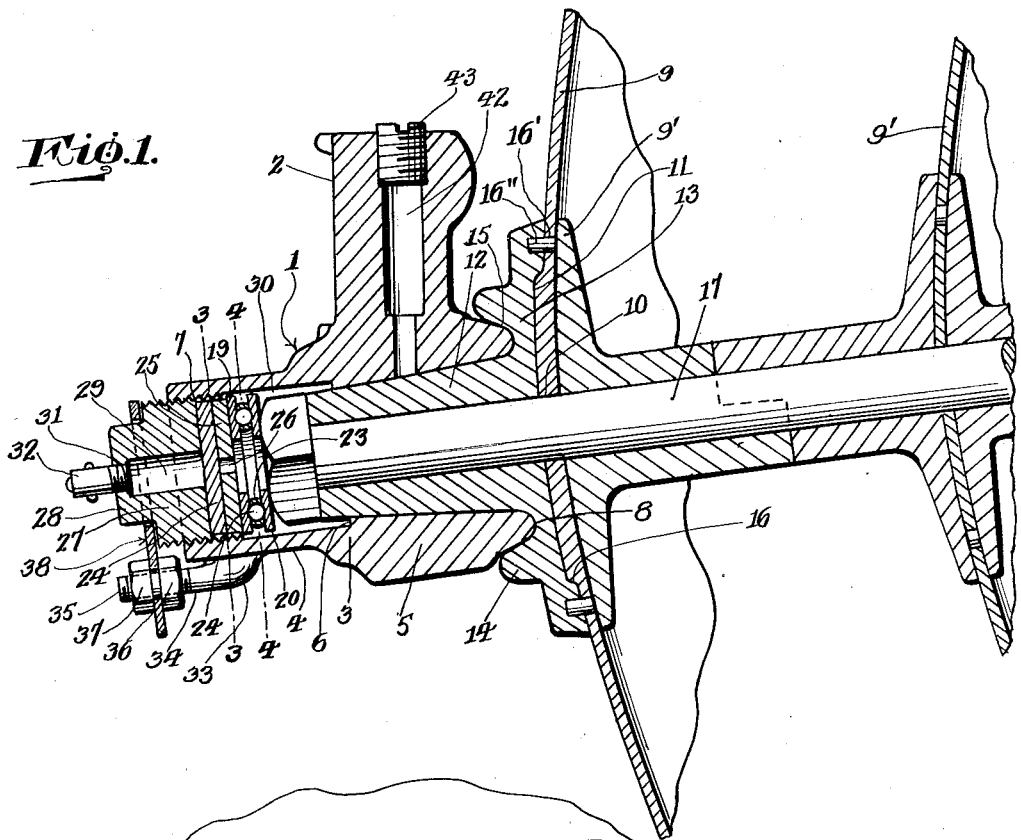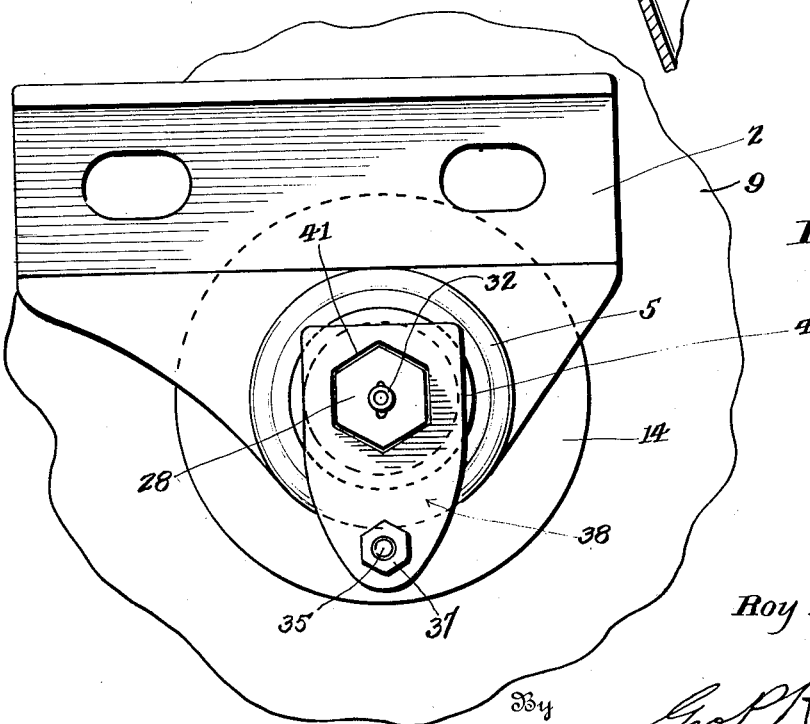

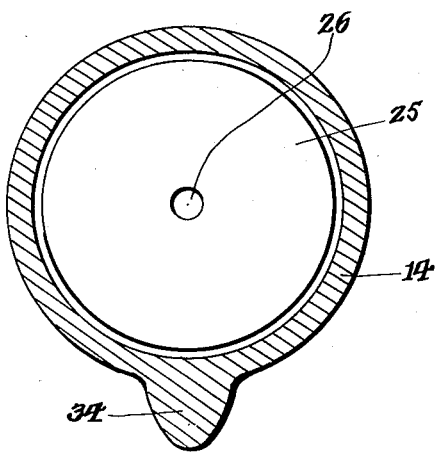
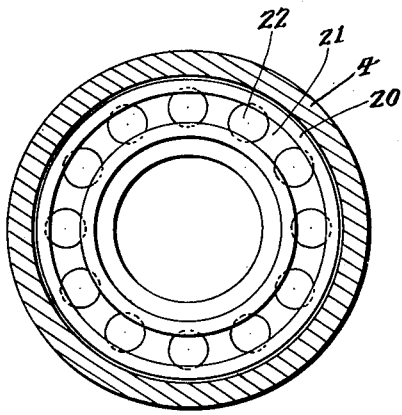
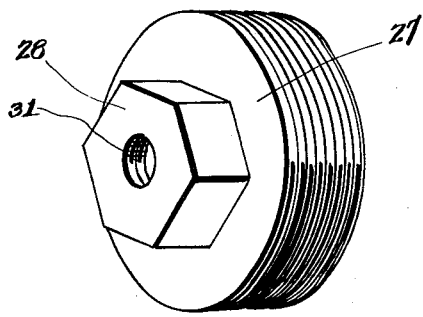
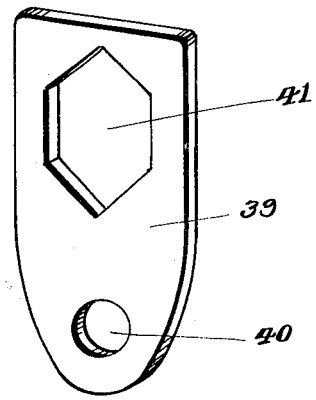
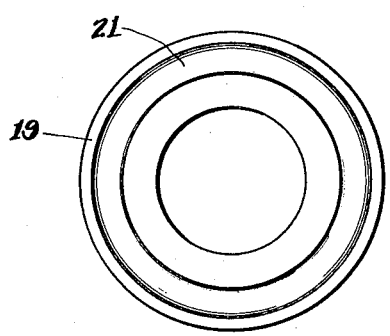

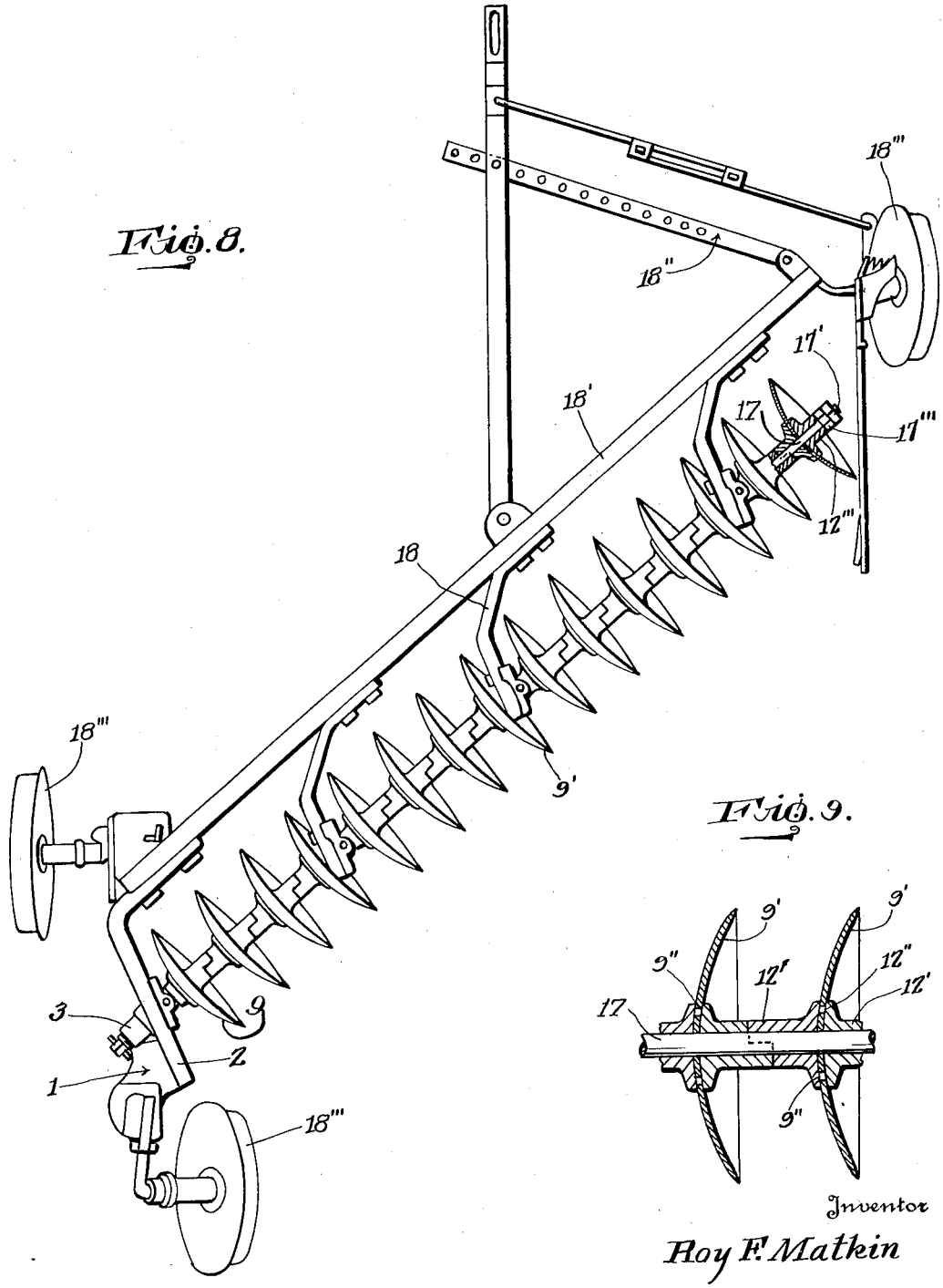

1,932,592

UNITED STATES PATENT OFFICE 1,932,592

THRUST BEARING

Roy F. Matkin, Liberal, Kans.

Application October 20, 1931. Serial No. 570,013

8 Claims. (Cl. 97—53)

This invention relates to a thrust bearing designed primarily for use in connection with the shafts of one-way plows of the disc type, but it is to be understood that a thrust bearing in accordance with this invention may be employed in any connection for which it is found applicable.

The one-way plow of the disc type includes a shaft extended forwardly at an angle operating free at its forward end and carrying a series of discs spaced by bearings and with the latter connected with the discs to bodily move therewith.

It is the essential objects of this invention to provide a thrust bearing for the rear end of such shaft and with the bearing so constructed and arranged to carry substantially the entire load of the plow; to permit the plow to run easily and freely making the draft lighter; to prevent binding of the shaft at the rear end thereof; capable of being quickly and readily adjusted for wear when required; conveniently locked in adjusted position; and to attain these ends in a strong, durable, comparatively simple, compact and inexpensive structure.

To the above ends essentially my invention consists in such parts and in such combination of parts as fall within the scope of the invention as claimed.

In the drawings:

Figure 1 is a vertical sectional view of a thrust bearing in accordance with this invention, as applied to the shaft of a one-way disc plow.

Figure 2 is a front elevation of the bearing.

Figure 3 is a section on line 3—3 Figure 1.

Figure 4 is a section on line 4—4 Figure 1.

Figure 5 is a perspective view of the plug.

Figure 6 is a like view of the locking member.

Figure 7 is an elevation looking towards the grooved face of a ball race forming member.

Figure 8 is a fragmentary view in perspective of a one-way plow of the disc type showing the adaptation of a thrust bearing, in accordance with this invention as applied to one end of the plow shaft.

Figure 9 is a sectional detail illustrating a bearing between a pair of discs.

Referring to the drawings, the bearing includes a casting referred to generally at 1 and which is formed of an upstanding, flanged, slotted hanger part 2 and a lower horizontally disposed housing part 3 formed integral with the bottom of part 2. The latter is disposed transversely with respect to part 3 and permits of the casting 1 being secured in the desired position.

The part 3 is disposed at a forward inclination from its outer to its inner end and is formed with an outer tubular portion 4 of uniform diameter and an inner portion 5 gradually increasing in inner diameter from its point of joinder with portion 4 to its inner end. At the joint of joinder of portion 5 with portion 4, the inner diameter of the former is less than that of the latter to provide the part 3 with an internal annular shoulder 6. The part 3 is open at each end and the inner face of portion 4 for a part of its length is provided with threads 7. The inner end of portion 5 is rounded as at 8.

There is illustrated a series of spaced discs arranged in a forwardly inclined row. The rear disc of the series is designated 9 and the other discs of the series at 9'. The disc 9 is formed with an axial opening and on its outer face with a central circular enlargement 11. The disc 9 is coupled to a tubular tapered bearing 12 which operates free in portion 5 and extends into the inner part of portion 4 of part 3. The bearing 12 has its inner end formed with an enlarged, outwardly directed annular flange 13 formed on its outer face with an annular rib 14 providing in connection with the body of the bearing a recess 15 conforming in contour to and receiving the inner end of portion 5. The inner face of flange 13 is recessed as at 16 to receive the enlargement 11. The diameter of flange 13 is such as to abut the outer face of disc 9 adjacent the enlargement 11. The disc 9 is formed with openings 16' which receive pins 16'' carried by the flange 13 whereby bearing 12 and disc 9 will revolve in unison directly upon the plow shaft 17.

The shaft 17 extends forwardly at an inclination from its rear to its forward end 17' and carries all of the discs of the series. The discs 9' are separated by bearing members 12' of spool like form. Each member 12' is flanged at each end and is formed of a pair of intermeshing sections. Each disc 9' is provided with a set of openings 9'' into which extends lugs 12'' formed on the forward end flange of each member 12' whereby the latter is coupled to the disc 9' to bodily revolve therewith. The rear end flange of each member 12' bears against the forward face of a rear disc. There is interposed between the disc 9 and a disc 9' a bearing member 12'. The forward end of shaft 17 carries a bearing 12''' which has its rear end bearing against the forward face of the forward disc 9'. Carried by the rear end of shaft 17 is a clamping nut 17'' which abuts the rear end of bearing 12. Carried by the forward end of shaft 17 is a holdfast means 17'''' which abuts the bearing 12'' and in connection with the nut 17'' clamps the discs and bearings rigidly together so when moving relatively to shaft 17 they will travel in unison. Hangers 18 are provided for the plow shaft and which are carried by a main beam 18' attached to the casting 1 and with an adjustable swinging draw bar hitch 18". Supporting wheels are indicated at 18''' and 18'''', the latter being swivelled to casting 1.

Positioned with the portion 4 of part 3 is a pair of spaced, opposed, oppositely disposed ball race forming members 19, 20 of like form and each of which consists of an annulus having one face provided with a circular groove 21 of concave cross section to constitute a raceway for a portion of the bearing balls 22 revolubly mounted in an annular cage 23 positioned between the members 19, 20. The member 20 seats against the nut 17". Arranged within the portion 4 of part 3 is a pair of abutting washers or discs 24, 25 in the form of circular discs. Washer 24 is solid and washer 25 has an axial opening 26. Washer 25 abuts member 19. The members 19, 20 and washers 24, 25 are of a diameter to be spaced from the inner face of portion 4 of part 3.

Threadedly engaging with the threads 7 of portion 4 of part 3 is a peripherally threaded adjustable closure plug 27 for the outer end of portion 4. The plug 27 acts to maintain the washers 24, 25 in abutting engagement, the washer 25 against member 19, the members 19, 20 against the balls 22, the member 20 against the head of bolt 17 and for taking up wear when occasion requires.

The plug 27 has its outer face provided with an outwardly directed polygonal lug 28 and is formed axially with a lubricant receiving pocket 29 which extends from a point in promixity to the outer end of lug 28 to the inner end of the plug. The pocket 29 opens into the portion 4 when the plug is connected to the latter. The plug in connection with the portion 4 provides a lubricant containing chamber 30. The lug 28 axially thereof is provided with an opening 31 having a threaded wall. The opening 31 communicates with pocket 29 and attached to the wall of such opening is an Alemite fitting 32.

Formed integral with the outer face of portion 4 is an angle shaped arm 33 having one portion thereof indicated at 34 disposed in parallelism to portion 4 and extended beyond the outer end of the latter to oppose the lug 28. The portion 34 of arm 33 is peripherally threaded as at 35 for connection therewith of a stop nut 36 and a clamping nut 37.

Associated with the plug 27 for the purpose of holding it in its adjusted position is a locking member 38 consisting of a plate 39 provided in proximity to one end thereof with a circular opening 40, and in proximity to its other end with a polygonal shaped opening 41 corresponding in contour to that of lug 28. The plate 39 when mounted in position has one end seat the outer end of plug 27 and the inner face of its other end against nut 36. The lug 28 extends through opening 41 and the portion 34 of arm 33 extends through opening 40. Clamping nut 37 is then positioned against the outer face of plate 39 locking the latter in position and providing for member 38 to lock plug 27 in set position.

Lubricant is supplied to the outer periphery of spindle 12 through a passage 42 provided in the part of casting 1. Passage 42 is closed by a removable plug 43.

The resistance to the thrust of the spindle may be increased or diminished as desired, by adjusting the plug 27. The spindle 12 has a snug fit with the inner face of portion 5 of part 3.

What I claim is:—

1. A thrust bearing structure for the rear end of a forwardly inclined plow shaft of a one-way disc plow, comprising the combination with a forwardly inclined plow shaft of circular cross section adapted to have revolubly mounted directly thereon a series of spaced plow discs, of a casting having a lower portion inclined in the direction of the plow shaft, said portion being formed of a tubular inner and a tubular outer part merging into each other, said inner part gradually increasing in inner diameter from its rear to its forward end, a tapered bearing of greater length than, extending through and snugly engaging the inner face of said inner part, said bearing element having a bore of uniform diameter inclined in the direction of the shaft and formed at its forward end with a flange overlapping the forward end of said inner part and adapted to be secured to the rear outer disc of said series, said shaft having the rear end terminal portion thereof extending through said disc, element and into said outer part, means within the latter, mounted on the rear end of the shaft and abutting the rear end of said element for connecting the shaft to said element, said outer part providing a lubricant chamber, a bearing device within said chamber and abutting the rear end of the shaft and said means, a lubricant conducting plug closing the rear end of said outer part and discharging into said chamber, and abutting discs interposed between the plug and said device.

2. A thrust bearing structure for the rear end of a forwardly inclined plow shaft of a one-way disc plow, comprising the combination with a forwardly inclined plow shaft of circular cross section adapted to have revolubly mounted directly thereon a series of spaced plow discs, of a casting having a lower portion inclined in the direction of the plow shaft, said portion being formed of a tubular inner and a tubular outer part merging into each other, said inner part gradually increasing in inner diameter from its rear to its forward end, a tapered bearing of greater length than, extending through and snugly engaging the inner face of said inner part, said bearing element having a bore of uniform diameter inclined in the direction of the shaft and formed at its forward end with a flange overlapping the forward end of said inner part and adapted to be secured to the rear outer disc of said series, said shaft having the rear end terminal portion thereof extending through said disc, element and into said outer part, means within the latter, mounted on the rear end of the shaft and abutting the rear end of said element for connecting the shaft to said element, said outer part providing a lubricant chamber, a bearing device within said chamber and abutting the rear end of the shaft and said means, a lubricant conducting plug closing the rear end of said outer part and discharging into said chamber, abutting discs interposed between the the plug and said device, and said casting having its upper portion in the form of a hanger and provided with a lubricant supply means leading to said element.

3. A thrust bearing structure for the rear end of a forwardly inclined plow shaft of a one-way disc plow, comprising the combination with a forwardly inclined plow shaft of circular cross section adapted to have revolubly mounted directly thereon a series of spaced plow discs, of a casting having a lower portion inclined in the direction of the plow shaft, said portion being formed of a tubular inner and a tubular outer part merging into each other, said inner part gradually increasing in inner diameter from its rear to its forward end, a tapered bearing of greater length than, extending through and snugly engaging the inner face of said inner part, said bearing element having a bore of uniform diameter inclined in the direction of the shaft and formed at its forward end with a flange overlapping the forward end of said inner part and adapted to be secured to the rear outer disc of said series, said shaft having the rear end terminal portion thereof extending through said disc, element and into said outer part, means within the latter, mounted on the rear end of the shaft and abutting the rear end of said element for connecting the shaft to said element, said outer part providing a lubricant chamber, a bearing device within said chamber and abutting the rear end of the shaft and said means, a lubricant conducting plug closing the rear end of said outer part and discharging into said chamber, abutting discs interposed between the plug and said device, and the inner of said abutting discs having an axial opening.

4. A thrust bearing structure for the rear end of a forwardly inclined plow shaft of a one-way disc plow, comprising the combination with a forwardly inclined plow shaft of circular cross section adapted to have revolubly mounted directly thereon a series of spaced plow discs, of a casting having a lower portion inclined in the direction of the plow shaft, said portion being formed of a tubular inner and a tubular outer part merging into each other, said inner part gradually increasing in inner diameter from its rear to its forward end, a tapered bearing of greater length than, extending through and snugly engaging the inner face of said inner part, said bearing element having a bore of uniform diameter inclined in the direction of the shaft and formed at its forward end with a flange overlapping the forward end of said inner part and adapted to be secured to the rear outer disc of said series, said shaft having the rear end terminal portion thereof extending through said disc, element and into said outer part, means within the latter, mounted on the rear end of the shaft and abutting the rear end of said element for connecting the shaft to said element, said outer part providing a lubricant chamber, a bearing device within said chamber and abutting the rear end of the shaft and said means, a lubricant conducting plug closing the rear end of said outer part and discharging into said chamber, abutting discs interposed between the plug and said device, said casting having its upper portion in the form of a hanger and provided with a lubricant supply means leading to said element, and the inner of said abutting discs having an axial opening.

5. A thrust bearing structure for the rear end of a forwardly inclined plow shaft of a one-way disc plow, comprising the combination with a forwardly inclined plow shaft of circular cross section adapted to have revolubly mounted directly thereon a series of spaced plow discs, of a casting having a lower portion inclined in the direction of the plow shaft, said portion being formed of a tubular inner and a tubular outer part merging into each other, said inner part gradually increasing in inner diameter from its rear to its forward end, a tapered bearing of greater length than, extending through and snugly engaging the inner face of said inner part, said bearing element having a bore of uniform diameter inclined in the direction of the shaft and formed at its forward end with a flange overlapping the forward end of said inner part and adapted to be secured to the rear outer disc of said series, said shaft having the rear end terminal portion thereof extending through said disc, element and into said outer part, means within the latter, mounted on the rear end of the shaft and abutting the rear end of said element for connecting the shaft to said element, said outer part providing a lubricant chamber, a bearing device within said chamber and abutting the rear end of the shaft and said means, a lubricant conducting plug closing the rear end of said outer part and discharging into said chamber, and abutting discs interposed between the plug and said device, said abutting discs and bearing device being of less diameter than the inner diameter of said outer part.

6. A thrust bearing structure for the rear end of a forwardly inclined plow shaft of a one-way disc plow, comprising the combination with a forwardly inclined plow shaft of circular cross section adapted to have revolubly mounted directly thereon a series of spaced plow discs, of a casting having a lower portion inclined in the direction of the plow shaft, said portion being formed of a tubular inner and a tubular outer part merging into each other, said inner part gradually increasing in inner diameter from its rear to its forward end, a tapered bearing of greater length than, extending through and snugly engaging the inner face of said inner part, said bearing element having a bore of uniform diameter inclined in the direction of the shaft and formed at its forward end with a flange overlapping the forward end of said inner part and adapted to be secured to the rear outer disc of said series, shaid shaft having the rear end terminal portion thereof extending through said disc, element and into said outer part, means within the latter, mounted on the rear end of the shaft and abutting the rear end of said element for connecting the shaft to said element, said outer part providing a lubricant chamber, a bearing device within said chamber and abutting the rear end of the shaft and said means, a lubricant conducting plug closing the rear end of said outer part and discharging into said chamber, abutting discs interposed between the plug and said device, and said casting having its upper portion in the form of a hanger and provided with a lubricant supply means leading to said element, said abutting discs and bearing device being of less diameter than the inner diameter of said outer part.

7. A thrust bearing structure for the rear end of a forwardly inclined plow shaft of a one-way disc plow, comprising the combination with a forwardly inclined plow shaft of circular cross section adapted to have revolubly mounted directly thereon a series of spaced plow discs, of a casting having a lower portion inclined in the direction of the plow shaft, said portion being formed of a tubular inner and a tubular outer part merging into each other, said inner part gradually increasing in inner diameter from its rear to its forward end, a tapered bearing of greater length than, extending through and snugly engaging the inner face of said inner part, said bearing element having a bore of uniform diameter inclined in the direction of the shaft and formed at its forward end with a flange overlapping the forward end of said inner part and adapted to be secured to the rear outer disc of said series, said shaft having the rear end terminal portion thereof extending through said disc, element and into said outer part, means within the latter, mounted on the rear end of the shaft and abutting the rear end of said element for connecting the shaft to said element, said outer part providing a lubricant chamber, a bearing device within said chamber and abutting the rear end of the shaft and said means, a lubricant conducting plug closing the rear end of said outer part and discharging into said chamber, abutting discs interposed between the plug and said device, and the inner of said abutting discs having an axial opening, said abutting discs and bearing device being of less diameter than the inner diameter of said outer part.

8. A thrust bearing structure for the rear end of a forwardly inclined plow shaft of a one-way disc plow, comprising the combination with a forwardly inclined plow shaft of circular cross section adapted to have revolubly mounted directly thereon a series of spaced plow discs, of a casting having a lower portion inclined in the direction of the plow shaft, said portion being formed of a tubular inner and a tubular outer part merging into each other, said inner part gradually increasing in inner diameter from its rear to its forward end, a tapered bearing of greater length than, extending through and snugly engaging the inner face of said inner part, said bearing element having a bore of uniform diameter inclined in the direction of the shaft and formed at its forward end with a flange overlapping the forward end of said inner part and adapted to be secured to the rear outer disc of said series, said shaft having the rear end terminal portion thereof extending through said disc, element and into said outer part, means within the latter, mounted on the rear end of the shaft and abutting the rear end of said element for connecting the shaft to said element, said outer part providing a lubricant chamber, a bearing device within said chamber and abutting the rear end of the shaft and said means, a lubricant conducting plug closing the rear end of said outer part and discharging into said chamber, abutting discs interposed between the plug and said device, said casting having its upper portion in the form of a hanger and provided with a lubricant supply means leading to said element, and the inner of said abutting discs having an axial opening, said abutting discs and bearing device being of less diameter than the inner diameter of said outer part.

ROY F. MATKIN.